United States Patent [19]

McGowan

[11] 4,092,994

[45] June 6, 1978

[54] VALVES

[75] Inventor: Eric McGowan, St. Austell, England

[73] Assignee: United Gas Industries Limited, London, England

[21] Appl. No.: 668,725

[22] Filed: Mar. 19, 1976

[30] Foreign Application Priority Data

Apr. 14, 1975 United Kingdom ............... 15151/75

[51] Int. Cl.² .............................................. F16K 1/46
[52] U.S. Cl. ................. 137/65; 251/DIG. 1; 251/333
[58] Field of Search .................. 251/DIG.1, 333, 364; 137/65

[56] References Cited

U.S. PATENT DOCUMENTS

| 2,538,364 | 1/1951 | James et al. | 251/DIG.1 |
| 2,904,072 | 9/1959 | Palen | 251/333 X |
| 3,682,437 | 8/1972 | Miller | 251/333 X |

FOREIGN PATENT DOCUMENTS

| 464,500 | 4/1950 | Canada | 251/DIG. 1 |
| 1,064,159 | 12/1953 | France | 251/DIG. 1 |
| 97,787 | 4/1961 | Netherlands | 251/DIG. 1 |

Primary Examiner—Arnold Rosenthal
Attorney, Agent, or Firm—Larson, Taylor and Hinds

[57] ABSTRACT

A floating O-ring is located between a valve plate and a valve seat to seal the valve, and is prevented from slipping out of alignment with the seat by cylindrical or conical guide structure.

3 Claims, 3 Drawing Figures

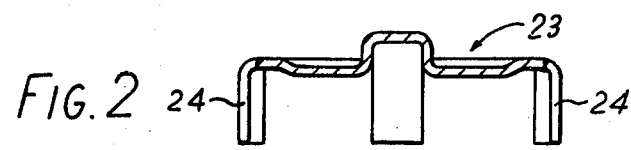
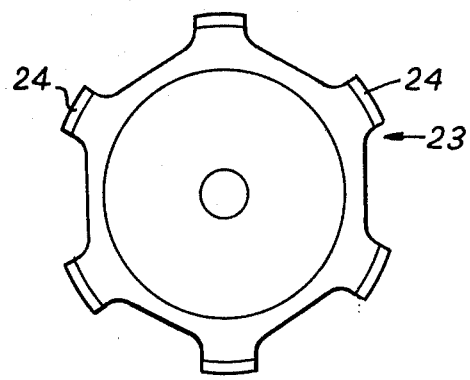

VALVES

This invention relates to valves and particularly to valve seals.

The invention provides a valve having a valve plate and an annular valve seat therefor, said plate being movable away from said seat to open the valve, an annular sealing member located between the valve plate and the seat, said sealing member not being secured either to the plate or the seat, and guide structure preventing lateral movement of said sealing member such as would take it out of alignment with the seat.

Preferably said guide structure comprises cylindrical or conical structure co-operating with either inner or outer peripheries of the sealing member to limit its lateral movement.

The guide structure may be a part-cylindrical member movable with the valve plate and fitting loosely within the inner periphery of the sealing member.

The sealing member may be an O-ring of resilient plastic material.

Previous designs of valve have had the valve plate faced with an adherent layer of compressible material. This has shown a tendency to stick to the valve seat and lift away from the valve plate, so obstructing the valve area when the valve opens. By means of the invention, sticking of the annular sealing member to the valve seat or the valve plate makes no difference to the open area of the valve, since gas may flow either side thereof.

According to one embodiment the valve is a gas safety valve arranged to be opened by a thermal assembly.

A preferred embodiment of the invention is shown in the accompanying drawings, in which:

FIG. 2 is a section through a guide plate incorporated in the valve of FIG. 1, and FIG. 3 is a plan view of the guide plate of FIG. 2.

Figure 1:
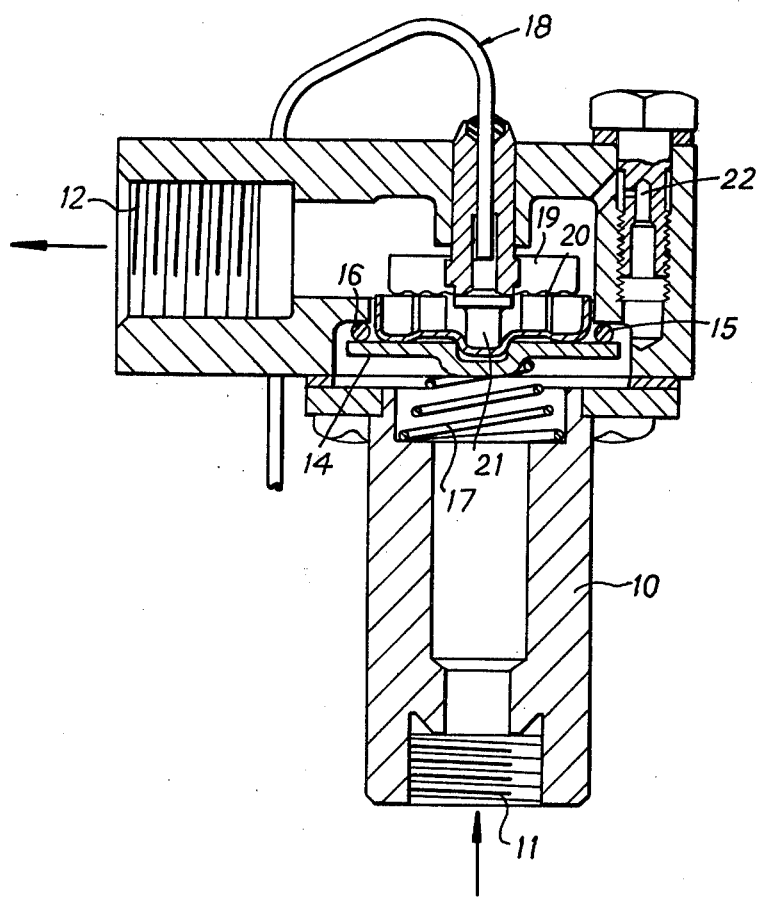
FIG. 1 is a section through a valve

Referring to FIGS. 1 – 3, a flame-failure-detecting gas valve has a housing 10 providing a gas inlet 11 and a gas outlet 12. Between the inlet and outlet is a valve plate 14 which seats via an O-ring 15 on a shoulder 16 of the housing, which shoulder forms the valve seat. A spring 17 seated in the housing urges the valve plate 14 to the closed position, as also does the pressure of the gas supply.

A thermal assembly 18 of which only part is shown has a phial located in relation to a pilot gas burner so as to sense the increased temperature when the pilot is alight. The consequent increased pressure of a fluid in the phial is communicated to an expansible chamber 19, the two opposed sides of which comprise flexible diaphragms 20. An operating button 21 secured to one diaphragm urges the valve plate 14 in the sense to open it when a flame is sensed. A by-pass 22 around the valve plate allows a minimum flow of gas at all times to maintain the pilot alight, but the valve will not open to allow increased flow unless the pilot is lighted.

The O-ring 15 is of resilient plastics material and is floating in the sense of movement of the valve plate, i.e., it is not secured to either the valve plate 14 or to the seat 16. As the valve opens therefore the O-ring is free to take up any position in the direction of opening. A castellated guide plate 23 (seen best in FIGS. 2 and 3) comprises a central disc portion and spaced fingers 24 extending normally to the centre position together forming a part-cylindrical surface. The plate 23 is located between the valve plate 14 and the button 21, the fingers 24 fitting loosely in the housing, so that it can move with the valve plate. The O-ring extends around the periphery of the fingers 24 so as to be located in the diametral sense thereby. The O-ring is therefore prevented from slipping sideways out of the valve opening area. The O-ring may in other constructions be replaced by components of other cross-section, e.g. rectangular.

I claim:

1. A valve having a valve plate and an annular valve seat, said valve plate being movable axially toward and away from said seat, an annular sealing member lying freely between said plate and seat, guide means comprising a disc with a single ring of spaced fingers extending normally therefrom around the periphery thereof, said disc abutting the valve plate and said spaced fingers extending loosely within the annular sealing member to prevent lateral movement thereof such as would take it out of alignment with the seat but allowing the sealing member freedom to move axially with respect to the fingers and means for operating said valve by abutting the disc and thereby moving the valve plate.

2. A valve as claimed in claim 1 wherein said annular sealing member is an O-ring formed of resilient plastics material.

3. A valve as claimed in claim 2, wherein said means for operating said valve includes a temperature-sensitive device moving an operating button in the sense to open the valve when increased temperature is sensed.

* * * * *